Figure 1:
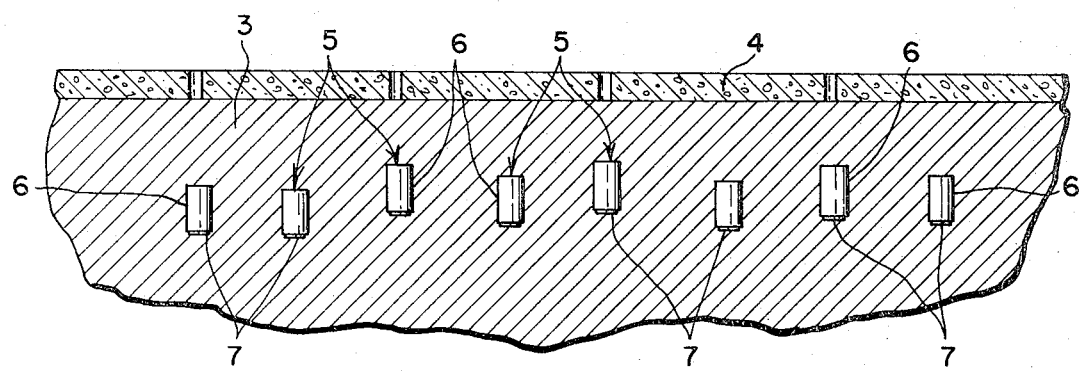

United States Patent [19]
Basile

[11] 3,835,578
[45] Sept. 17, 1974

[54] METHOD OF TREATING SOIL FOR CONTROLLING TERMITES AND THE LIKE

[76] Inventor: Mario J. Basile, 8512 Fifth Ave., Brooklyn, N.Y.

[22] Filed: Nov. 15, 1972

[21] Appl. No.: 306,933

Related U.S. Application Data

[63] Continuation-in-part of Ser. No. 300,278, Oct. 24, 1972, abandoned.

[52] U.S. Cl. ................... 43/132, 43/131, 47/48.5
[51] Int. Cl. ................ A01m 1/20, A01m 17/00
[58] Field of Search ........ 43/124, 131, 132; 47/48.5

[56] References Cited
UNITED STATES PATENTS

| | | | |
|---|---|---|---|
| 2,931,140 | 4/1960 | Laffler et al. | 47/48.5 |
| 3,060,012 | 10/1962 | Pavek | 47/48.5 |
| 3,232,007 | 2/1966 | Boatwright | 47/48.5 |

*Primary Examiner*—Warner H. Camp
*Attorney, Agent, or Firm*—Howard C. Miskin

[57] ABSTRACT

A soil is treated for termite or like control by dispersing in the soil a termite toxic insecticide in an active available state and a termite toxic insecticide in an initially unavailable state and timed to be released before complete dissipation of the immediately available insecticide. The initially unavailable insecticide is enveloped in a metal container which corrodes in the soil environment or in a synthetic organic polymeric resin envelope which is degraded to release the insecticide shortly before dissipation of the initially available insecticide to increase the time of termite inhibition in the soil, or in a metal container which corrodes and an organic polymeric resin plug, which plug is attractive to and edible by the termites.

8 Claims, 2 Drawing Figures

PATENTED SEP 1 7 1974　　　　　　　　　　　3,835,578

METHOD OF TREATING SOIL FOR CONTROLLING TERMITES AND THE LIKE

This is a continuation-in-part application of my now abandoned copending application Ser. No. 300,278, filed Oct. 24, 1972.

The present invention relates generally to improvements in termite control and it relates particularly to an improved method for treating soil to control subterranean termites or the like for extended periods of time.

The damage to wood containing buildings by subterranean termites, which are prevalent in both northern and southern areas, is very extensive, and various procedures are widely employed to minimize and prevent such damage. A practice which is widely and generally employed in this connection involves the impregnation of the soil with a persistent termite toxic insecticide before the erection of the wood containing structure thereon. However, the insecticides which are employed are not indefinitely effective and after a few years, the treated soil is no longer toxic to termites and termite colonies may then be established in the soil with consequent damage to the overlying structure. It thus becomes necessary upon deplection of the insecticide to replenish the insecticide in the soil, a procedure which in many cases is highly expensive and inconvenient particularly where the building includes a concrete floor slab resting directly on the ground, since this necessitates the drilling of numerous holes in the ground slab to permit the treatment of the underlying soil as well as the digging of trenches about the base of the structure. Thus the retreatment of the soil underlying a building for termite control is an expensive, inconvenient process and any practice which reduces the frequency of the necessity of such procedures is highly desirable.

It is therefore a principal object of the present invention to provide an improved termite control process.

Another object of the present invention is to provide an improved process for the treatment of soil for the control of subterranean termites.

Still another object of the present invention is to provide an improved process for increasing the duration of the effectiveness of the termite control treatment of soil and enhancing a subterranean termite barrier.

A further object of the present invention is to provide an improved process for treating soil prior or subsequent to the erection of a structure thereon and attendant to the conventional termite control treatment thereof for extending the time of and reinforcing the termite inhibition properties of the soil.

Still a further object of the present invention is to provide a process of the above nature characterized by its simplicity, reliability and high versatility and adaptability.

Figure 2:
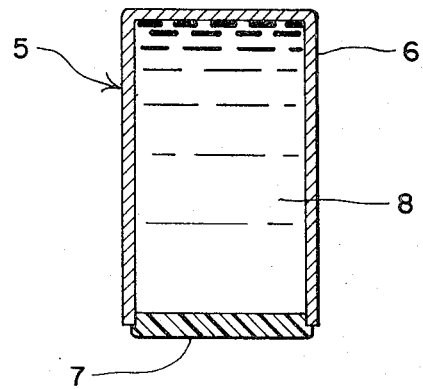

The above and other objects of the present invention will become apparent from a reading of the following description taken in conjunction with the accompanying drawing which illustrates a preferred embodiment thereof wherein FIG. 1 is a vertical sectional view of a slab on ground construction treated in accordance with the present method; and FIG. 2 is a longitudinal medial longitudinal sectional view of a termicide loaded receptacle embodying the present invention;

In a sense, the present invention contemplates the provision of a method for treating a soil to control subterranean termites comprising dispersing in the soil a termite toxic insecticide in an available and active state and a termite toxic insecticide in an initially unavailable state and releasable into the soil after a predetermined time interval or after reinfestation. The initially unavailable insecticide is advantageously released when the initially available insecticide has sufficiently dissipated, so that the support of termite colonies in the soil is no longer prevented and the subterranean termite barrier is continued or when termites appear before the release of the unavailable insecticide by corrosion.

The initially unavailable insecticide is advantageously distributed in the soil in closed receptacles such as envelopes or containers which prevent the escape of the insecticide and preserve the full activity thereof. The receptacles are formed of a metal which sufficiently corrodes in the soil in the desired time, for example, in about 5 years, and may for example, be formed of thin steel plate. If desired, in order to accelerate the corrosion of the metal another metal may be associated with the containers to promote electrolytic action or to delay the corrosion, the metal may be plated with a more corrosion resistant metal or otherwise selectively coated. Also, the receptacle may be formed of a synthetic organic polymeric resin, for example a thin polyethylene, a cellulosic material, such as cellulose acetate, a polystyrene or a polyvinyl chloride, polyvinyl acetate, phenol formaldehyde, neoprene and styrene dibromide, or synthetic rubbers, which weathers and ruptures in the desired time interval as explained above or is attractive to the termites, which consume the plastic and release the insecticide. Instead of relying on the action of the soil to corrode or degrade the receptacle, a suitable agent may be contained in the receptacle having such activity and which does not adversely affect the insecticide. Normally the corrosion rate of the metal receptacle depends on the metal used, its thickness, soil composition and any additive used.

Among the termite toxic insecticides which may be employed both as the initially available and unavailable insecticides are chlordane, dieldrin, benzene hexachloride, aldrin, heptaclor and the like. In the application of the immediately available insecticides they are advantageously applied as water emulsions although they may be highly concentrated oil solutions or water emulsions, and in cases where the insecticide has a high vapor pressure, as in the case of dieldrin, it may be containerized in the solid state. Similarly, even a powder form can be used and depend on the moisture of the soil to permeate. Furthermore the containers are advantageously of small size and may be capsules or microcapsules of suitably corrodable or degradable material or may be deferred by a suitable coating on the insecticide substrate. In a form for use around the foundation; long thin cylinders or tubes can be used, deformed to close off certain lengths. Another form of container to be used as illustrated in FIG. 2 can combine a metal container 6, closed at one end, with a plastic plug 7 at the other end preventing the insecticide 8 which is in fluid form, as explained herein, from flowing from the metal container. The plug is made from a plastic that termites find attractive and consume. If the container is placed in the ground so that the plug is the lowest point, when the termites consume the plug, the insecticide flows from the container and treats the soil. Some plastics that termites find attractive and consume are cellulose acetate, polyvinyl chloride, polyvinyl acetate, polystyrene, phenol formaldehyde, neoprene, styrene dibromide, and synthetic rubbers.

The insecticides may be applied before the erection of the overlying structure or, whenever indicated, to the underlying soil of an existing structure. Thus, in treating the soil before the erection of the building, the soil is impregnated with a solution or emulsion of the termite toxic insecticide and the units of the delayed release termite toxic insecticide are uniformly distributed throughout the soil and the overlying structure when erected. Where the underlying soil of an existing structure is treated, a similar procedure is followed, trenches being dug about the structure and holes being drilled in the concrete ground slab where present, to facilitate and permit the dispersion and distribution of the immediately available and the delayed release insecticides.

By way of example as shown in FIG. 1 in the treatment of the soil 3 underlying a slab-on-ground house, holes of about ½ inch to 1 inch in diameter are made in the slab 4 about one foot apart and 6 inches from the wall. Thereafter, an aqueous emulsion of dieldrin of about 0.5 percent concentration is pumped into the underlying soil through the holes at the rate of at least 2 and preferrably in excess of 3 gallons of the dieldrin emulsion for each five lineal feet of wall. Corrodable metal cans or cans 5 having closure plugs formed of a material attractive to and edible by termites, of the nature described above and containing a high concentration emulsion of the dieldrin, for example exceeding 18 percent strength or undiluted dieldrin, are inserted through the holes into the underlying soil and the holes are then sealed. The metal cans are formed of a predetermined thickness of can type sheet steel depending on the type of soil in which it is to be used or coated depending on the same characteristics. Along the outside of the building, a trench is dug about six to eight inches wide and about a foot deep and the 0.5 percent strength emulsion is applied to the trench at the same rate as applied through the holes preferably by first applying part of the dieldrin emulsion to the trench, distributing the containers of dieldrin along the trench, covering the base of the trench with about four to six inches of soil, applying the remainder of the 0.5 percent dieldrin emulsion and enclosed dieldrin and filling the trench with additional soil and tamping the soil. Advantageously the amount of dieldrin applied as aqueous emulsion and that applied in cans are approximately equal although the proportions may be varied depending on ambient conditions.

The above procedure may be varied in accordance with the type of structure, that is in connection with crawl space houses, basement houses, etc. Furthermore, other termite toxic insecticides, such as those earlier identified, may be substituted for the dieldrin, the period required to corrode the insecticide container being adjusted to correspond to the period of effectiveness of the insecticide in the soil. The containers are of a size permitting their insertion into the holes and their suitable distribution in the trenches and, as above set forth, may be formed of a synthetic organic polymeric resin such as soil weatherable polyethylene or the like or a termite edible cellulosic material that will disintegrate within the selected time period or be eaten by the termites, if they return sooner than expected or the corrosion rate of the container is slower than expected. The eaten container releases the insecticide when needed. A metal container with a plastic plug, as described earlier, can likewise be used.

It has been found that once the type of material of the container is decided upon, the wall thickness of the container can be selected to release the insecticide contained therein within the time period selected within a range of plus or minus approximately a year which is not critical, depending on the characteristics of the soil and the corrosion rate of the metal. Similarly, the thickness of a plastic plug can determine the time it is destroyed by the termites and release the insecticide.

While there have been described preferred embodiments of the present invention, it is apparent that numerous alterations, omissions and additions may be made without departing from the spirit thereof. For example, the soil may be treated in the above manner before the start of the building erection and the release of the insecticide may be delayed in other manners such as by coating encapsulation provided that the envelopes become ruptured or permeable to the insecticide at the desired time.

What is claimed is:

1. The method of treating soil for the control of subterranean termites comprising dispersing in the soil a termite toxic insecticide enveloped in an imperforate enclosure substantially impermeable to said insecticide, making a portion of said enclosure of a material attractive to and edible by said termites, placing that portion at the lower point of said enclosure in the soil so that any termites in the soil adjacent said enclosure would consume said portion and free said insecticide.

2. The method of claim 1 further including dispersing in the soil a termite toxic insecticide in an available and active state.

3. The method of claim 1 wherein attractive said material is a plastic.

4. The method of claim 3 wherein said enclosure is a container closed at one end and open at the other and formed of a metal that is corrodable in the environment of said soil, said portion attractive to and edible by said termites comprises a plug made of said plastic material and closing the open end of said container.

5. An article for delayed treatment of soil for subterranean termites comprising a termite toxic insecticide enveloped in an imperforate container having walls, said container walls including a wall portion formed from a material which is attractive to and consumed by termites.

6. The article of claim 5, wherein said material that is attractive to termites is made up of one of the following plastic materials; cellulose acetate, polyvinyl chloride, polystyrene, polyvinyl acetate, phenol formaldehyde, neoprene rubber and styrene dibromide.

7. The article of claim 6, wherein said container walls comprise a portion formed from a metal corrodable within a predetermined period under ambient conditions of the soil to be treated, and said wall portion formed from said plastic material that is attractive to and edible by termites.

8. An article of claim 6, wherein said container has one opening at one end, said walls including a metal portion corrodable within a predetermined period under ambient conditions of the soil to be treated, said wall portion formed from said plastic material that is attractive and edible by termites being a plug covering said opening.

* * * * *